United States Patent [19]

Takahata

[11] Patent Number: 5,254,528
[45] Date of Patent: Oct. 19, 1993

[54] BRAKE DEVICE INCLUDING MAGNET AND SUPERCONDUCTOR

[75] Inventor: Ryoichi Takahata, Yamatotakada, Japan

[73] Assignee: Koyo Seiko Co., Ltd., Osaka, Japan

[21] Appl. No.: 751,776

[22] Filed: Aug. 29, 1991

[30] Foreign Application Priority Data

Sep. 3, 1990 [JP] Japan .................... 2-233554

[51] Int. Cl.$^5$ .................... F16F 15/03; H01L 39/00
[52] U.S. Cl. ........................ 505/1; 188/164; 188/267
[58] Field of Search ............ 188/164, 267, 67, 161; 505/1, 700, 876, 877, 905

[56] References Cited

U.S. PATENT DOCUMENTS

| | | | |
|---|---|---|---|
| 2,066,131 | 12/1936 | White | 188/267 X |
| 2,130,528 | 9/1938 | Alexander | 188/267 X |
| 3,609,418 | 9/1971 | Halas | 310/10 |
| 3,742,265 | 6/1973 | Smith, Jr. | 310/52 |
| 3,889,140 | 6/1975 | Baermann | 310/103 |
| 4,058,746 | 11/1977 | Mole et al. | 505/877 X |
| 4,151,431 | 4/1979 | Johnson | 505/877 X |
| 4,164,987 | 8/1979 | Lagarde | 188/267 X |
| 4,886,778 | 12/1989 | Moon et al. | 505/1 |
| 4,908,553 | 3/1990 | Hoppie et al. | 318/382 |
| 4,931,732 | 6/1990 | Moon | 324/228 |
| 4,939,120 | 7/1990 | Moon et al. | 505/1 |
| 4,979,445 | 12/1990 | Lanzara | 104/281 |

FOREIGN PATENT DOCUMENTS

| | | |
|---|---|---|
| 1920138 | 10/1970 | Fed. Rep. of Germany . |
| 64170 | 6/1978 | Japan ............ 188/164 |
| 62-247753 | 3/1986 | Japan . |
| 1-295019 | 11/1989 | Japan . |

OTHER PUBLICATIONS

Morgan, General Theory of Electrical Machines, 1979, pp. 36-40.

Moon et al., Superconductivity, Jun. 1988, Mechanical Engineering, pp. 60-68.
Japanese newspaper article dated May 28, 1990.
Japanese magazine article dated May 28, 1990.
Japanese newspaper article dated Jun. 19, 1990.
Japanese newspaper article dated Jun. 20, 1990.
Hellman, F., et al., "Levitation of a magnet over a flat type II superconductor", J. Appl. Phys. 63 (2), Jan. 15, 1988, pp. 447-450.
Williams, R. and Matey, J. R., "Equilibrium of a magnet floating above a superconducting disk", Appl. Phys. Lett. 52 (9), Feb. 29, 1988, pp. 751-753.
Moon, F. C., et al., "Dynamic magnetic forces in superconducting ceramics", J. Appl. Phys. 66 (11), Dec. 1, 1989, pp. 5643-5645.
Moon, F. C., et al., "Hysteretic levitation forces in superconducting ceramics", Appl. Phys. Lett. 52 (18), May 2, 1988, pp. 1534-1536.

Primary Examiner—Robert J. Oberleitner
Assistant Examiner—Alfred Muratori
Attorney, Agent, or Firm—Mason, Fenwick & Lawrence

[57] ABSTRACT

A brake device which performs a braking operation on a rotating body in a non-contact mode, thereby substantially eliminating the need for replacement of components. To achieve this object, the invention provides a brake device which is especially suitable for use at temperatures allowing Type II superconducting properties. A magnet and a superconductor are provided, one of which is provided on a rotating body to be braked. The quantity of magnetic flux from the magnet which permeates the superconductor is controlled so as to provide a counter-rotative force to the rotating body. According to a first aspect of the invention, a permanent magnet is provided, along with a displacing mechanism to change the distance between the permanent magnet and the superconductor. According to a second aspect of the invention, an electromagnet is provided, along with a control device for controlling the magnetic strength of the electromagnet.

15 Claims, 3 Drawing Sheets

BRAKE DEVICE INCLUDING MAGNET AND SUPERCONDUCTOR

BACKGROUND OF THE INVENTION

1. Field of the Invention

The present invention relates to brake devices for braking a rotating body. More specifically, the invention relates to braking device for rotating bodies, including a magnet and Type II superconductor which permits magnetic flux to permeate itself.

2. Related Art

Means for braking rotating bodies are known in the art. For example, electromagnetic brakes or powder brakes are used for braking rotating bodies. These known brakes use magnetic attractive forces to brake a rotating body. However, they use friction produced by contacting bodies to produce a counter-rotative force. In these conventional brake devices, components are worn and heated by the friction, causing the disadvantage that periodic replacement of the components is necessary.

SUMMARY OF THE INVENTION

In view of the foregoing disadvantages of conventional brake devices, an object of the present invention is to provide a brake device which performs a braking operation in a non-contact mode, thereby substantially eliminating the need for replacement of components.

To achieve this object, the invention provides a brake device which is especially suitable for use at temperatures allowing Type II superconducting properties. A magnet and a superconductor are provided, one of which is provided on a rotating body to be braked. The quantity of magnetic flux from the magnet which permeates the superconductor is controlled so as to provide a counter-rotative force to the rotating body.

According to a first aspect of the invention, a permanent magnet is provided, along with displacing means to change the distance between the permanent magnet and the superconductor. According to a second aspect of the invention, an electromagnet is provided, along with the control means for controlling the magnetic strength of the electromagnet. Both aspects of the invention involve controlling the quantity of magnetic flux from the magnet which permeates the superconductor, thereby controlling the braking of the rotating body.

Other objects, features, and advantages of the invention will become apparent upon a review of the following Detailed Description and the accompanying drawing figures.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE PREFERRED EMBODIMENTS

Figure 1:
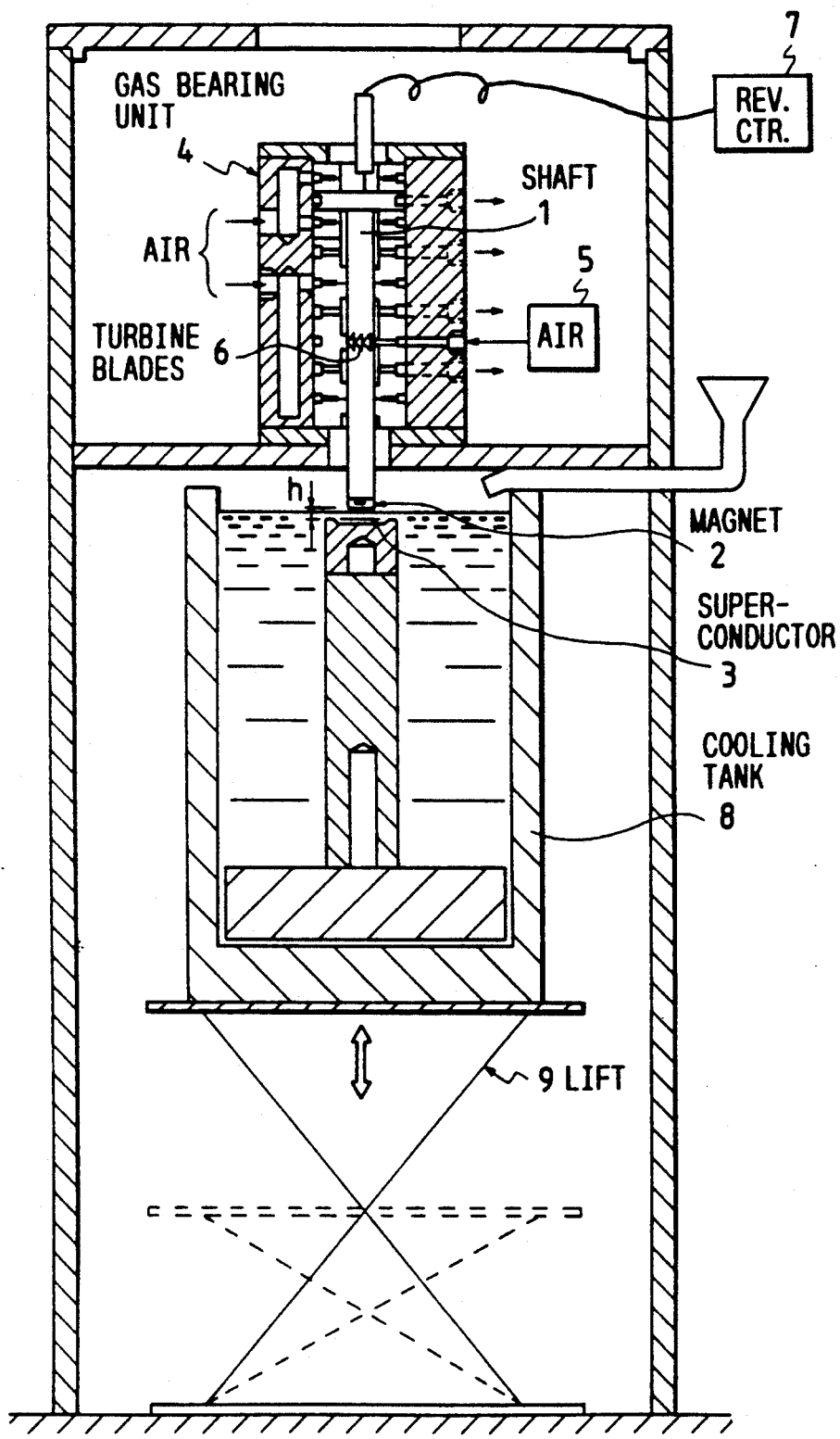
FIG. 1 is a vertical sectional view of a first embodiment of the present invention, the first embodiment reflecting an application of the first aspect of the invention as described above.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

The described embodiments of the present invention apply the principle that magnetic flux which permeates a superconductor may be used to provide a counter-rotative force. According to the invention, the superconductor, preferably a so-called "Type II" superconductor which permits magnetic flux to permeate it, is employed with a permanent magnet or electromagnetic. One of the properties of such a superconductor is that, when the magnetic flux of a magnet permeates the superconductor, the superconductor tends to move away from the magnet. In rotating a superconductor, the magnetic flux which permeates the superconductor will provide no counter-rotative force if the flux has a uniform and stable distribution pattern with respect to the axis of rotation (including the density of external magnetic flux acting on the surface of the superconductor). However, significantly, magnetic flux which permeates the superconductor provides counter-rotative force when the flux does not have a uniform and stable distribution pattern with respect to the axis of rotation.

In brake devices according to the present invention, the magnetic flux of a permanent magnet or electromagnet is allowed to permeate the superconductor. In operation, the relative position of the magnet and the superconductor is constantly changing as the rotating body rotates, so that the magnetic flux which permeates the superconductor becomes non-uniform in its distribution pattern with respect to the axis of rotation of the rotating body. Therefore, the magnetic flux provides a counter-rotative force against the rotating body, thus braking the rotating body.

As introduced briefly above, in the Summary of the Invention, the first aspect of the invention provides a magnet which is a permanent magnet, as well as a displacing means which changes the distance between the permanent magnet and the superconductor. Also, according to a second aspect of the present invention, an electromagnet is provided along with control means for controlling the magnetic strength of the electromagnet.

Five embodiments of the present invention are now described. In particular, first, second, and third embodiments (shown in FIGS. 1, 3, and 4) are described, as examples of the first aspect of the invention. Further, the fourth and fifth embodiments of the invention (shown in FIGS. 5 and 6) are described, as examples of the second aspect of the invention.

Referring now to FIG. 1, a first embodiment of the invention is illustrated as an example of the first aspect of the invention. In FIG. 1, reference 1 designates a rotary shaft which is the rotating member to be braked; reference numeral 2, a disk-shaped magnet secured to the end face of the rotary shaft; and reference numeral 3, a disk-shaped superconductor, preferably a type II superconductor, which is axially spaced distance h from the permanent magnet to the parallel to it.

Further, reference numeral 4 designates a gas bearing unit for supporting the rotary shaft 1 radially and axially in a non-contact mode; reference numeral 5, an air supply for supplying air streams to below against turbine blades 6 mounted on a central portion of the rotary shaft to rotate it; and reference numeral 7, a revolution counter for determining the speed of rotation of rotary shaft 1, in revolutions per minute.

Reference numeral 8 designates a cooling tank for holding superconductor 3; and reference numeral 9, a displacing means such as a lift for moving the cooling tank in a vertical direction. Cooling tank 8 contains liquid nitrogen to hold superconductor 3 at a critical temperature at which the superconductor 3 is placed in its superconductive state. Lift 9 may be moved vertically so as to adjust the distance h between the superconductor 3 and the permanent magnet 2 on the rotary shaft 1.

Permanent magnet 2 is chosen to be suitable in magnetic strength and have an appropriate magnetic strength distribution pattern. Superconductor 3 is preferably formed by uniformly mixing normal conductor particles ($Y_2Ba_1Cu_1$) in a substrate. The substrate is preferably made of a high temperature yttrium series superconductor having a high binding force, such as $Y_2BaCu_3O_x$. That is, the superconductor is preferably a socalled "Type II" superconductor which resists a permanent magnet's magnetic flux from permeating it.

Operation of a brake device thus constructed is now described.

When cooling tank 8 is moved down to a predetermined position, superconductor 3 is positioned away from shaft mounted permanent magnet 2. At this distance, the superconductor 3 may be considered completely free from the magnetic flux from the permanent magnet 2. In this arrangement, even when the rotary shaft is rotated at a predetermined speed, it rotates with no resistance because the superconductor 3 is free from the magnetic flux produced by the permanent magnet 2.

In order to stop the rotation of the rotary shaft 1, cooling tank 8 is moved up by using the displacing means (lift) 9 so that the superconductor approaches the permanent magnet 2. In the initial portion of this moving operation, the permanent magnet 2 is still relatively far from the superconductor 3, and the magnetic flux of the permanent magnet 2 only slightly permeates the superconductor. Almost all the magnetic flux is still repelled by the superconductor 3 in what may be referred to as the "Meissner effect." In this configuration, there is scarcely any counter-rotative force which resists rotation of the rotary shaft.

However, when the superconductor is moved closer to the permanent magnet, part of the magnetic flux from the permanent magnet permeates the superconductor 3 in what may be referred to as "a pinning phenomenon (a trap effect)." Under these circumstances, the magnetic flux applied to the superconductor constantly changes as the rotary shaft rotates, because the permanent magnet has a non-uniform strength distribution with respect to the axis of rotation. Hence, the magnetic flux permeating the superconductor has a non-uniform distribution pattern with respect to the axis of rotation. This non-uniform distribution of magnetic flux provides counter-rotative force acting against rotary shaft 1, causing it to decrease in speed, and eventually stop.

This braking action provided by permanent magnet 2 and superconductor 3 is now described with reference to experiments, the results of which are indicated in graphical form in FIG. 2. The experiments were carried out with four kinds of permanent magnets, resulting in the four illustrated curves. Each of the four permanent magnets were about 1000 gauss in magnetic strength. However, they differed in their variation of magnetic strength distribution with respect to the axis of rotation. Specifically, the variation of magnetic flux for the four magnets was, respectively, ±25 gauss, ±50 gauss, ±100 gauss, and ±200 gauss. In these experiments, the fluctuation in magnetic strength was measured by placing a Hall element opposite permanent magnet 2 while the rotary shaft 1 was rotated. In the experiment, the rotary shaft was rotated at 3000 rpm with each of the four kinds of permanent magnets, and then braked in accordance with principles of the invention.

Figure 2:
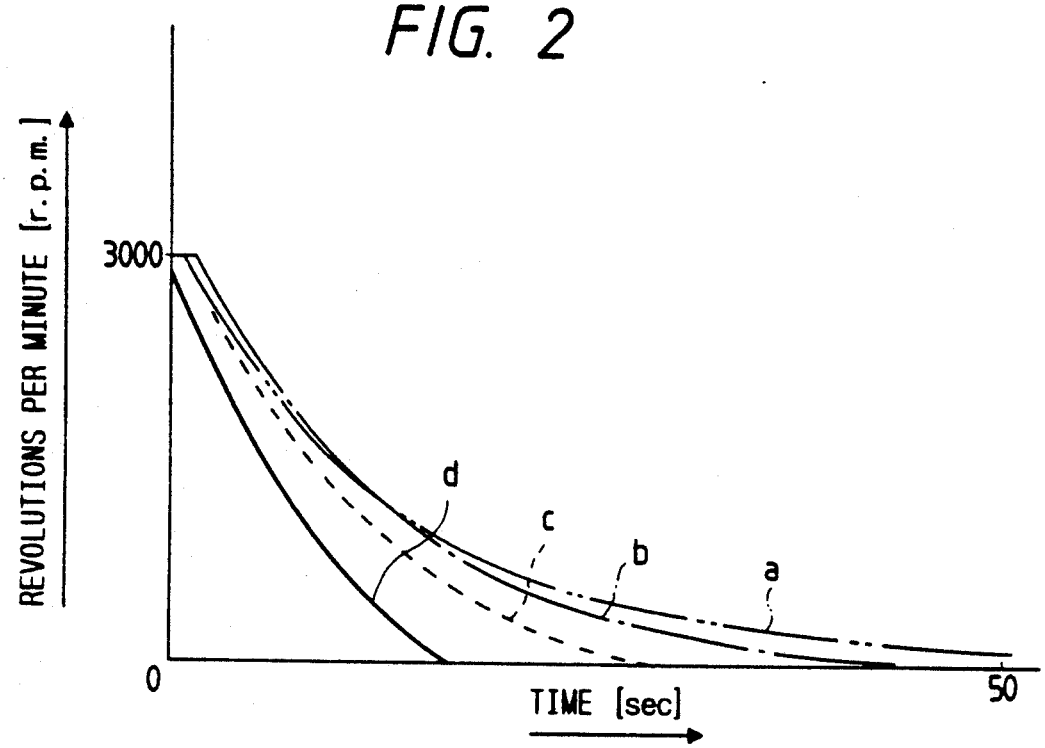
FIG. 2 is a graphical representation of the operation of the first embodiment shown in FIG. 1, illustrating the periods of time required for stopping a rotary shaft based on differences in variation of magnetic strength distribution with respect to the axis of rotation.

As shown in FIG. 2, curve a, the time which elapsed from the instant the rotary shaft was first braked, until the shaft stopped, was more than fifty seconds for the permanent magnet having ±25 gauss in magnetic strength distribution. FIG. 2, curve b, shows that about 40 seconds elapsed when using a permanent magnet which fluctuated about ±50 gauss. FIG. 2, curve c, shows that about 30 seconds elapsed when using a permanent magnet which varied about ±100 gauss. Finally, FIG. 2, curve d, shows that about 15 seconds lapsed when using the permanent magnet which varied approximately ±200 gauss.

As is apparent from the above-described experiments, when permanent magnets are equal in magnetic strength, the braking force they produce is proportional to the degree of variation of magnetic strength distribution with respect to the axis of rotation of the permanent magnet.

In the above-described embodiment, the permanent magnet 2 is mounted on the rotary shaft, and the superconductor 3 is arranged opposite the magnet but not mounted on the shaft. However, it is understood that the invention is not limited to this arrangement. For example, the positions of the permanent magnet and the superconductor may be exchanged, so that the superconductor is mounted on the shaft and the magnet is placed off the shaft. In fact, the second and third embodiments of the invention, shown in FIGS. 3 and 4, illustrate this variation.

Figure 3:
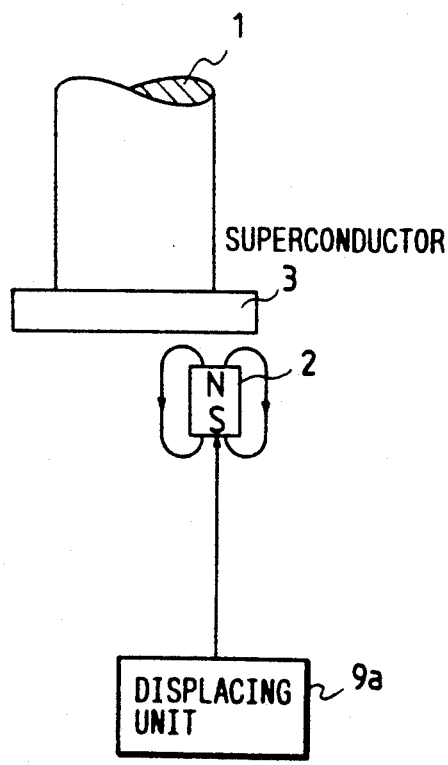
FIG. 3 is a side view showing essential components of a second embodiment of a brake device, showing application of the first aspect of the invention as described above.

In the second embodiment, shown in FIG. 3, a superconductor 3 is secured to the lower end of a rotary shaft 1. At least one permanent magnet 2 is arranged opposite the superconductor 3. The brake device is further provided with a displacing unit 9a which moves the permanent magnet toward or away from the superconductor 3. In this manner, the displacing unit 9a is operated to move the permanent magnet to adjust the quantity of magnetic flux which permeates the superconductor 3.

Figure 4:
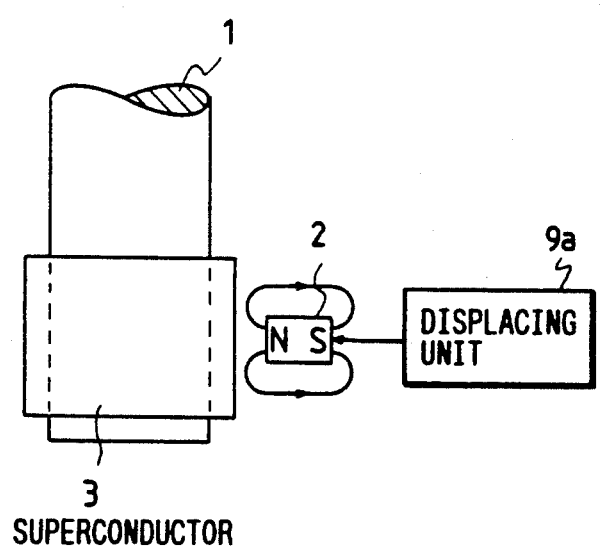
FIG. 4 is a side view showing essential components of third embodiment of the invention, showing application of the first aspect of the invention as described above.

In the third embodiment, shown in FIG. 4, a annular superconductor 3 is placed on the lower end of a rotary shaft 1. A permanent magnet 2 is disposed on a radial line of the annual superconductor. According to the present invention, more than one permanent magnet may be disposed in this manner, it being understood that the embodiment shown in FIG. 4 shows one permanent magnet purely for purposes of illustration and simplicity. Finally, in the manner analogous to the embodiment of FIG. 3, a displacing unit 9a is provided to move the magnet toward or away from superconductor 3.

In the second and third embodiments, shown in FIGS. 3 and 4, it has been stated that a plurality of permanent magnets may be employed, rather than the illustrated single magnet. In plural-magnet embodiments, the magnets should be arranged and oriented so that adjacent magnets are opposite in polarity. If, for example, four permanent magnets are employed and a first of the four permanent magnets has its N pole facing the superconductor, the two permanent magnets on opposite sides of the first permanent magnet should have their S poles facing the superconductor. The fourth permanent magnet, preferably diametrically opposite the first permanent magnet, should have its N pole facing the superconductor. In this arrangement, any adjacent permanent magnets are opposed in magnetic characteristics, so the difference in magnetic field variation between adjacent permanent magnets is increased, thereby enhancing the magnitude of the counter-rotative force which they produce.

Figure 5:
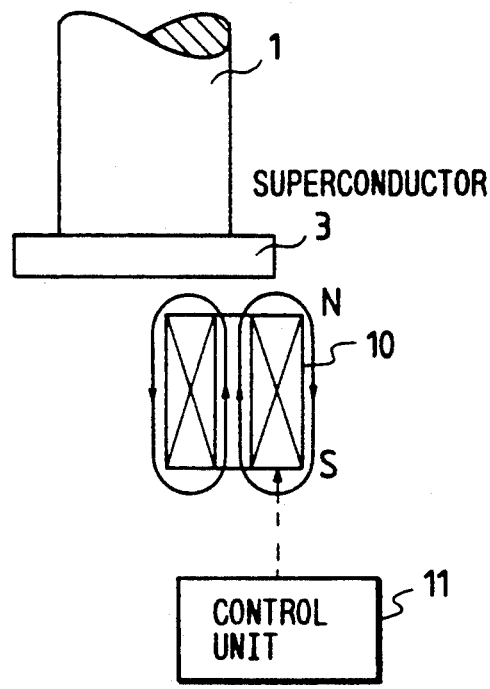
FIG. 5 is a side view showing essential parts of a fourth embodiment of a brake device according to the present invention, showing application of the second aspect of the present invention as described above.

FIG. 5 shows a fourth embodiment of the brake device according to the present invention, illustrating the second aspect of the invention. In the FIG. 5 brake device, a disk-shaped superconductor 3 is secured to the lower end face of a rotary shaft 1. Rotary shaft 1 is supported by a gas bearing unit 4 as in the first embodiment (FIG. 1). An electromagnet is arrangement opposite the superconductor 3 in an axial direction. In addition, a control unit 11 is provided to adjust the magnetic strength of the electromagnet 10. By implication, because the control unit 11 is adapted to change the magnetic strength of the electromagnet 10, it thereby controls the quantity of magnetic flux which permeates superconductor 3, in effect governing the braking characteristics of the brake device.

Figure 6:
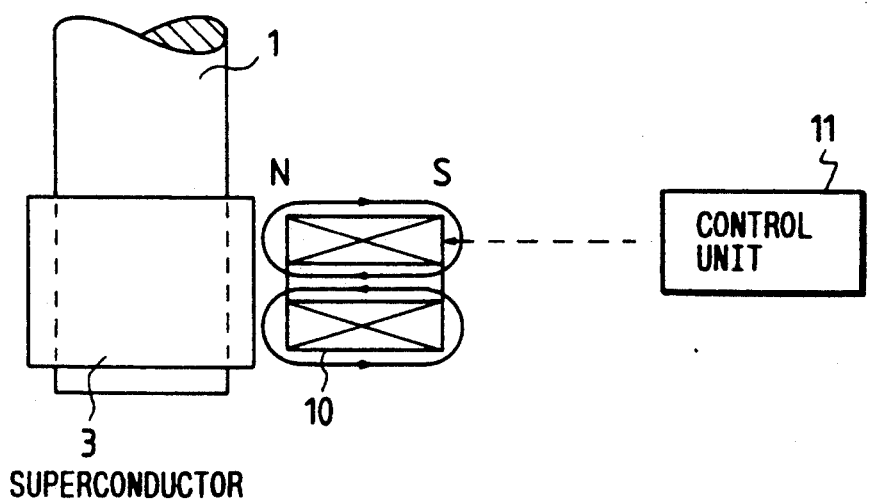
FIG. 6 is a side view showing essential parts of a fifth embodiment of the brake device according to the present invention, showing application of the second aspect of the present invention as described above.

FIG. 6 shows a fifth embodiment of the present invention, further demonstrating the second aspect of the invention. In the FIG. 6 brake device, an annular superconductor 3 is secured on the lower end portion of the rotary shaft 1. An electromagnet 10 is disposed on a radial line of the annular conductor. Plural electromagnets may be disposed in the same manner, it being understood that the embodiment of FIG. 6 need not be limited to use with a single magnet. In the FIG. 6 brake device, a control unit 11 is employed to change the magnetic strength of the electromagnet 10, thereby controlling the quantity of magnetic flux superconductor 3, governing the braking characteristics of the brake device.

In the fourth and fifth embodiments, shown in FIGS. 5 and 6, control unit 11 is operated to control the magnetic strength of the electromagnet 10, to thereby gradually decrease the speed of rotation of rotary shaft 1, finally stopping it. When more than one electromagnet is employed, any adjacent electromagnets are preferably arranged so that they are opposite in polarity to each other. This arrangement increases the variation of magnetic field between adjacent permanent magnets, enhancing the magnitude of the counter rotative force they produce.

As described above, the embodiments of the present invention allow a rotating body to be braked with no friction, providing the advantages that components are never worn by friction and that they are never heated by the same. Thus, it is unnecessary to replace components which would otherwise have to be replaced when using conventional brake devices. Thus, brake devices according to the present invention have considerably longer service lives than conventional brake devices.

According to the embodiments shown in FIGS. 3 to 6, the superconductor 3 is held at a predetermined temperature in which the superconductor 3 exhibits Type II superconducting properties. For example, the rotary shaft 1 is provided in the cooling unit. Alternatively, the hollow portion fluidly communicated with the superconductor 3 is provided in the rotary shaft 1 and hollow portion is directly communicated with the cooling unit. As a result, the superconductor 3 is always cooled.

Modifications and variations of the above-described embodiments of the present invention are possible, as appreciated by those skilled in the art in light of the above teachings. For example, the structure for supporting the rotary shaft and the manner of driving it are not to be limited to those illustrated in both. It is therefore to be understood that, within the scope of the appended claims and their equivalents, the invention may be practiced otherwise than as specifically described.

What is claimed is:

1. A brake device for a rotating body comprising:
   magnet means;
   a Type II superconductor positioned relative to said magnet means to permit permeation of said superconductor by magnetic flux from said magnet means so that a circumferential distribution of the magnetic flux with respect to the rotational axis of the rotating body becomes non-uniform so as to apply braking force to the rotating body, the braking force being generated by virtue of a pinning effect between the superconductor and the magnet means; and
   displacing means for effecting variation of the distance between said magnet means and said superconductor so as to adjust the braking force applied to the rotating body;
   wherein one of said magnet means and said superconductor rotates with the rotating body.

2. The brake device of claim 1, wherein:
   said magnet means includes at least one permanent magnet.

3. The brake device of claim 1, wherein:
   said magnet means is a disk-shaped permanent magnet affixed to an end of the rotating body; and
   said superconductor is a disk-shaped superconductor mounted for movement by said displacing means.

4. The brake device of claim 1, wherein:
   said superconductor is a disk-shaped superconductor affixed on an end of the rotating body; and
   said magnet means is mounted for movement by said displacing means.

5. The brake device of claim 1, wherein:
   said superconductor is an annular superconductor which is disposed about the rotating body; and
   said magnet means is displaced axially from the superconductor.

6. The brake device of claim 1, wherein:
   said magnet means comprises a single magnet.

7. A brake device for a rotating body, comprising:

electromagnet means having a controllable magnetic strength;

a Type II superconductor positioned relative to said electromagnet means for permitting permeation of said superconductor by magnetic flux from said electromagnet means so that a circumferential distribution of the magnetic flux with respect to the rotational axis of the rotating body becomes non-uniform so as to apply braking force to the rotating body, the braking force being generated by virtue of a pinning effect between the superconductor and the magnet means; and control means for controlling the magnetic strength of said electromagnet means so as to adjust the braking force applied to the rotating body;

wherein one of said electromagnet means and said superconductor rotates with the rotating body.

8. The brake device of claim 7, wherein:
said superconductor is a disk-shaped superconductor affixed to an end of said rotating body; and
said electromagnet means is axially spaced from said superconductor.

9. The brake device of claim 7, wherein:
said superconductor is an annular superconductor disposed about said rotating body; and
said electromagnet means is spaced radially from the superconductor.

10. The brake device of claim 7, wherein:
said electromagnet means comprises a single electromagnet.

11. A brake device for a rotating body, comprising:
magnet means;

a Type II superconductor positioned relative to said magnet means to permit permeation of said superconductor by magnetic flux from said magnet means so that a circumferential distribution of the magnetic flux with respect to the rotational axis of the rotating body becomes non-uniform so as to apply braking force to the rotating body, the braking force being generated by virtue of a pinning effect between the superconductor and the magnet means; and means for adjusting the amount of said magnetic flux which permeates said superconductor so as to adjust the braking force applied to the rotating body;

wherein one of said magnet means and said superconductor rotates with the rotating body.

12. The brake device of claim 11, wherein said means for adjusting includes:
displacing means for determining a displacement between said magnet means and said superconductor.

13. The brake device of claim 11, wherein:
the magnet means includes electromagnet means having a controllable magnetic strength; and
said means for adjusting includes a control means for controlling said magnetic strength of said electromagnet means.

14. A method comprising the steps of:
providing a rotatable member;
providing a superconductor, cooled so as to have Type II superconductive properties;
varying a magnetic field around the rotatable member while rotating it; and
applying a resistance to the rotation of the rotatable member by using only the varied magnetic field and the superconductor, the resistance being generated by a pinning effect between the superconductor and a source of the magnetic field.

15. An apparatus, comprising:
a rotatable member;
a Type II superconductor
means for varying a magnetic field around the rotatable member in conjunction with its rotation; and
means for applying a resistance to the rotation of the rotatable member using only the varied magnetic field and the superconductor, the resistance being generated by a pinning effect between the superconductor and a source of the magnetic field.

* * * * *